E. F. JONES & C. A. BARNES.
ASH BOX.
APPLICATION FILED AUG. 21, 1909.
971,845.
Patented Oct. 4, 1910.
2 SHEETS—SHEET 1.
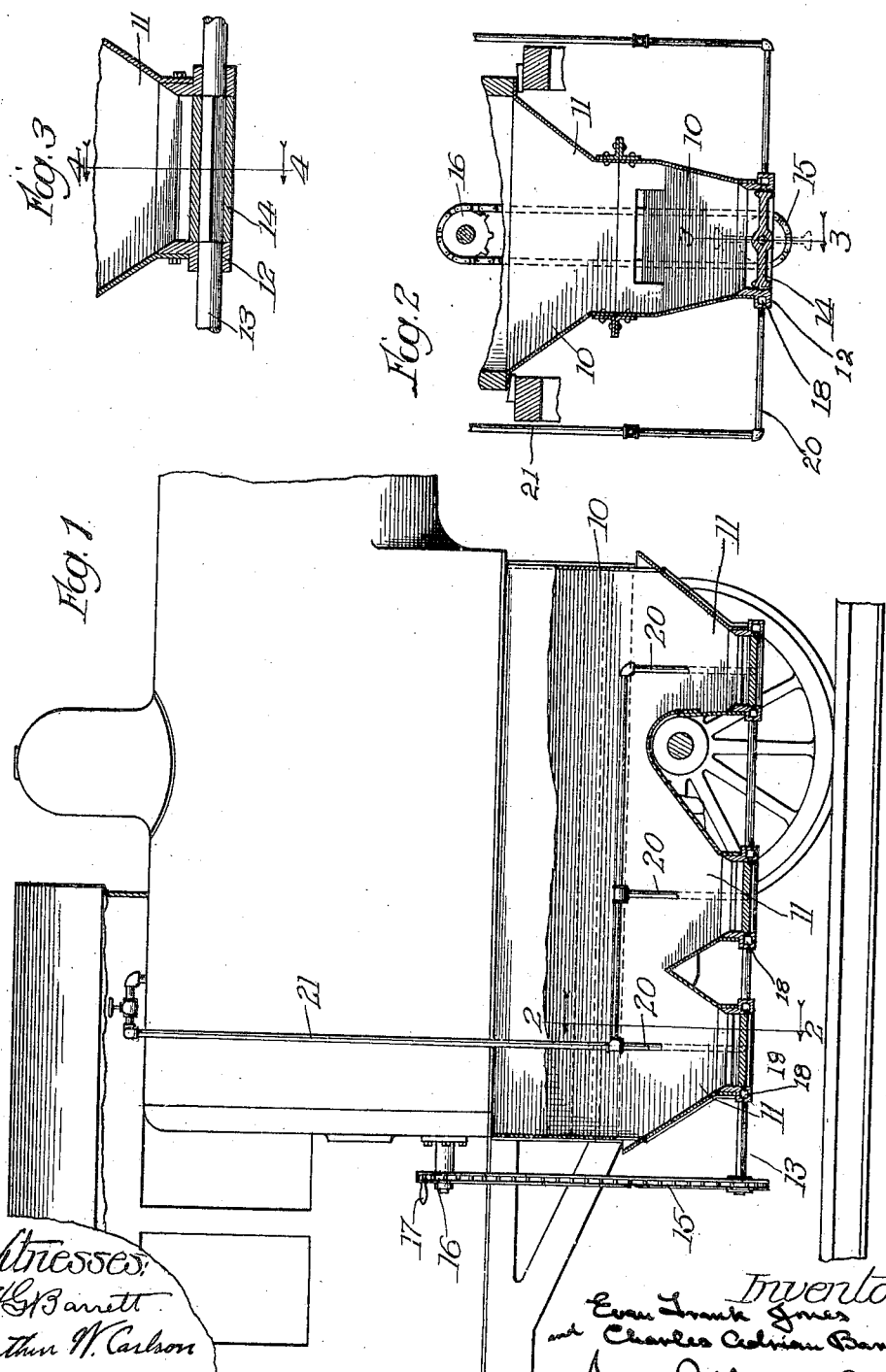

E. F. JONES & C. A. BARNES.
ASH BOX.
APPLICATION FILED AUG. 21, 1909.
971,845.
Patented Oct. 4, 1910.
2 SHEETS—SHEET 2.
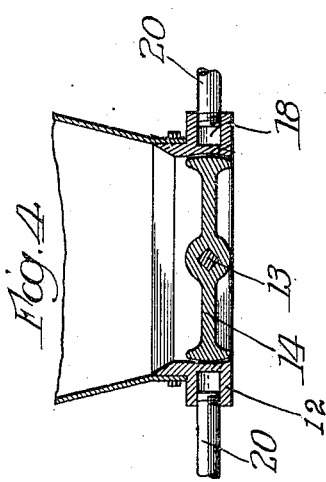
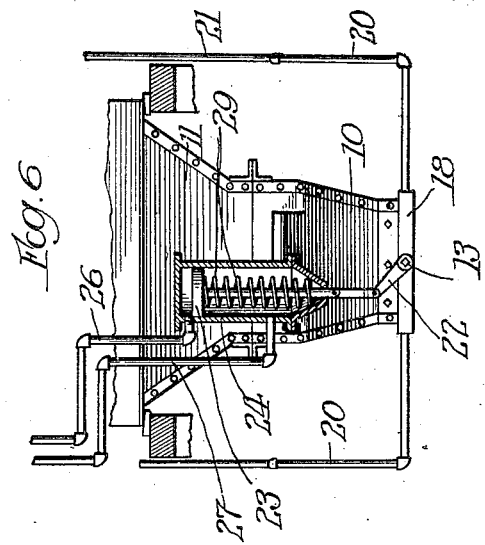
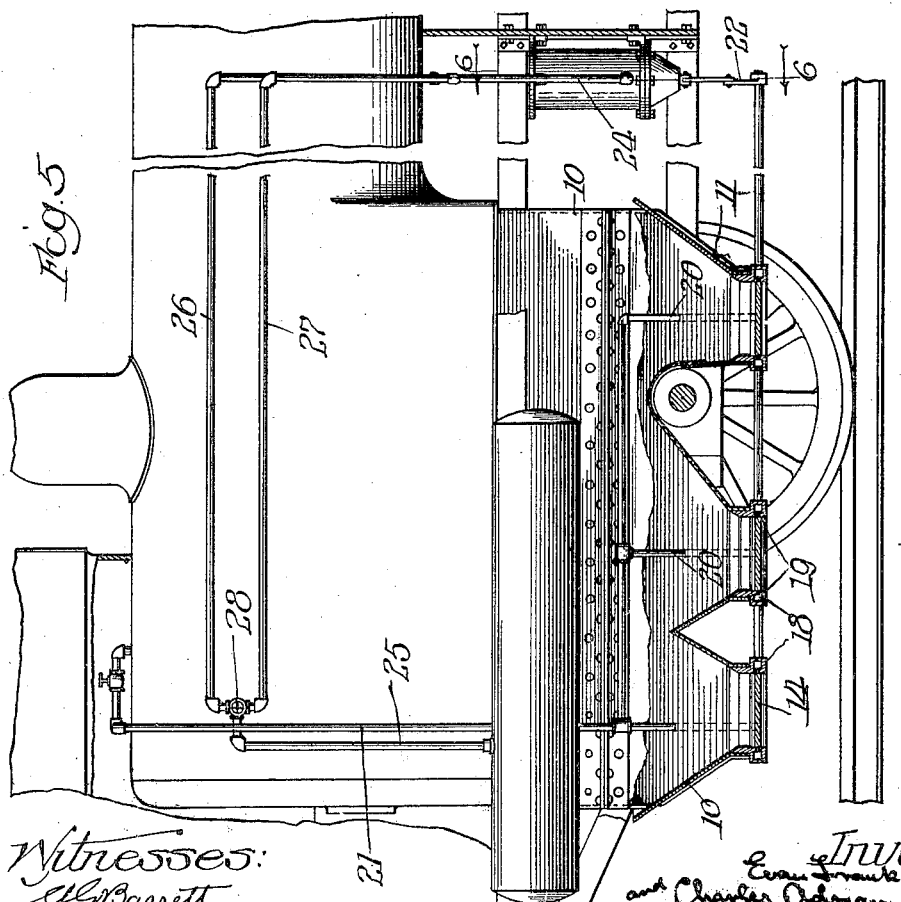

UNITED STATES PATENT OFFICE.

EVAN FRANK JONES AND CHARLES ADRAIN BARNES, OF CHICAGO, ILLINOIS.

ASH-BOX.

971,845.  Specification of Letters Patent.  Patented Oct. 4, 1910.

Application filed August 21, 1909. Serial No. 514,072.

*To all whom it may concern:*

Be it known that we, EVAN FRANK JONES and CHARLES ADRAIN BARNES, citizens of the United States, residing at Chicago, in the county of Cook and State of Illinois, have invented new and useful Improvements in Ash-Boxes, of which the following is a full, clear, concise, and exact description, reference being had to the accompanying drawing, forming a part of this specification.

Our invention relates to ash boxes for locomotives and the like and has for its object the removal of certain disadvantages to which they have hitherto been subject.

In most of the methods employed in dumping the contents of the ash boxes of locomotives, it is necessary for the fireman or engineer to crawl in beneath the engine, or, at any rate, to descend from the cab onto the track. Owing to the fact that it may become necessary to dump the contents of the ash box at almost any point on the route, and often in places where trains are continually passing and where shunting is being carried on, accidents very frequently occur to firemen and engineers while they are engaged in dumping the ashes. Another disadvantage of the ash box as at present used is that their contents are liable to freeze solid in cold weather, whereby dumping is rendered practically impossible.

It is one of the objects of our invention, therefore, to provide an ash box for locomotives or the like, the contents of which may be dumped without there being any necessity for the fireman or engineer to descend from the cab.

Another object of our invention is the providing of an ash box for locomotives with means whereby its contents are prevented from becoming frozen in cold weather.

An embodiment of our invention is illustrated, by way of example, in the accompanying drawings, in which—

Figure 1 is a side elevation of a portion of a locomotive carrying an ash box constructed in accordance with our invention, the lower portion of one side of the ash box being broken away to show the interior parts; Fig. 2 is a vertical section taken on the line 2—2 of Fig. 1; Fig. 3 is an enlarged sectional view, the section being taken on the line 3—3 of Fig. 2; Fig. 4 is a vertical section taken on the line 4—4 of Fig. 3; Fig. 5 is a side elevation similar to Fig. 1, but showing a modified means for effecting the dumping operation; and Fig. 6 is a vertical section taken on the line 6—6 of Fig. 5.

Like reference characters refer to like parts throughout the specification and in the various figures of the drawing.

The ash box 10 is formed at its lower side with a number of funnel-shaped chutes 11, the chutes being, in the construction illustrated, three in number. The lower ends of the chutes 11 are open but are arranged to be closed by movable gates, so that, when the gates are closed, ashes will be retained in the box and prevented from falling on the track, while the gates may be opened when it is desired to dump the ashes.

In carrying out our invention we insert into the open end of each chute 11 a rectangular annular casting 12, each of which castings is provided with bearings for receiving a gate-operating shaft 13 which extends longitudinally of the ash box through each of the castings 12. Mounted upon the shaft 13 within the end of each chute is a normally horizontal gate 14 which closes the chute and prevents the ashes from escaping therefrom. The shaft 13 is squared (see Figs. 3 and 4), or other means are provided for preventing rotation of the gates 14 relatively to the shaft 13, and it will thus be seen that when the shaft is rocked through 90 degrees, the gates 14 will be moved from their horizontal position, shown in full lines in Fig. 2, to their vertical position, shown in dotted lines in the same figure, in which position ashes can escape from the ash box. In order that this rocking movement of the shaft 13 may be effected, a sprocket wheel 14 is provided upon the rear end of the shaft 13, and is connected, by means of a chain 15, with a second sprocket wheel 16 mounted in the cab of the engine. This last sprocket wheel is provided with a handle or the like 17 by means of which it may be rotated to cause the rocking movement of the shaft 13 required to open or close the gates 14.

It will be seen that, by the use of this device, there is no necessity for the fireman or engineer to descend from the cab in order to effect the dumping of the contents of the ash box. When the ashes are to be dumped, it is merely necessary to turn the sprocket wheel 16 a sufficient amount to cause the opening of the gates 14, whereby the ashes are allowed to drop out of the box. When the box is emptied, the sprocket wheel 16 is turned in the opposite direction to close the gates.

In order to prevent the freezing up of the contents of the ash box during cold weather, we form each casting 12 with an outwardly extending peripheral bead. This bead is hollow and forms two substantially semi-annular steam chambers 18, one on each side of the bearing in which the shaft 13 is mounted. A perforation 19 permits the passage of steam from each steam chamber 18 to the interior of its particular chute, so that steam will circulate in the chamber 18 and flow out through the perforation. The circulating steam prevents the freezing of the contents of the chute. Steam is admitted to the chambers 18 by means of branch pipes 20 on either side of the ash box connected by means of vertical pipes 21 with a source of supply of steam. This source of supply may be the boiler of the locomotive or a branch pipe leading from the exhaust. In warm weather there is, of course, no necessity to admit steam to the chambers 18.

In some cases it may be desirable to provide a more powerful method of actuating the shaft 13 than is afforded by the chain and sprocket device described above. In such cases we may provide the shaft 13 with a crank 22 (see Figs. 5 and 6). This crank is arranged to be moved through a quarter of a revolution by the action of a piston 23 mounted in a cylinder 24. The cylinder 24 is connected, above the piston, to a pipe 25 leading to the compressed air tank of the locomotive by means of a pipe 26 and is connected, below the piston, to the pipe 25 by means of a pipe 27. A three-way cock 28 is provided for admitting compressed air to the pipe 26 or to the pipe 27 or for shutting off the air altogether, as desired. When compressed air is admitted to the pipe 26, the piston 23 is forced downward and the shaft 13 thereby rocked to open the gates 14. When it is desired to close the gate 14 the valve 28 is operated to admit air to the pipe 27 whereby the piston is forced upward and the shaft 13 rocked back to close the gates. In order to definitely maintain the gates in their closed position, a suitable spring, such as 29, may be provided, if desired.

Having thus described our invention, what we claim as new and desire to secure by Letters Patent, is—

1. An ash box for locomotives comprising a plurality of chutes, each having a discharge opening in the lower end thereof, a plurality of annular castings arranged to be secured in said discharge openings, a shaft extending centrally across said castings and having bearings therein, gates mounted on said shaft, said gates being arranged to normally close said discharge openings, and means for rocking said shaft whereby said gates are opened.

2. An ash box for locomotives comprising a plurality of chutes each having a discharge opening in the lower end thereof, a plurality of annular castings arranged to be secured in said discharge openings, a shaft extending centrally across said castings and having bearings therein, gates mounted on said shaft, said gates being arranged to normally close said discharge openings, a crank carried by the rear end of said shaft, a compressed air motor arranged to operate said crank to rock said shaft whereby said gates are opened, and a valve located in the cab of the engine for controlling the supply of compressed air to said compressed air motor.

In witness whereof, we have hereunto subscribed our names in the presence of two witnesses.

EVAN FRANK JONES.
CHAS. ADRAIN BARNES.

Witnesses:
   CHARLES G. COPE,
   CHAS. CLAUDY.